US005360174A

United States Patent [19]

Persson

[11] Patent Number: 5,360,174

[45] Date of Patent: Nov. 1, 1994

[54] ARRANGEMENT FOR REGISTERING THE INSTANT GRINDING CHARGE VOLUME OF A GRINDING DRUM

[75] Inventor: Sture Persson, Skellefteå, Sweden

[73] Assignee: Skega AB, Ersmark, Sweden

[21] Appl. No.: 983,563

[22] PCT Filed: Jun. 16, 1992

[86] PCT No.: PCT/SE92/00439

§ 371 Date: Apr. 7, 1993

§ 102(e) Date: Apr. 7, 1993

[87] PCT Pub. No.: WO93/00996

PCT Pub. Date: Jan. 21, 1993

[30] Foreign Application Priority Data

Jul. 12, 1991 [SE] Sweden ........................ 9102174-1

[51] Int. Cl.[5] ..................... B02C 17/20; B02C 17/16; G01D 3/00

[52] U.S. Cl. ................................ 241/183; 241/182; 73/862.634

[58] Field of Search ................. 241/33, 96, 182, 183, 241/299, 300; 73/862.632, 862.634

[56] References Cited

U.S. PATENT DOCUMENTS

| | | | |
|---|---|---|---|
| 4,289,279 | 9/1981 | Brandt | 241/183 |
| 4,446,192 | 5/1984 | Dehlen | 241/DIG. 30 |
| 4,515,319 | 5/1985 | Wei | 241/183 |
| 4,588,975 | 5/1986 | Roloff et al. | 73/862.634 |
| 4,688,434 | 8/1987 | Cherbuy | 73/862.634 |

FOREIGN PATENT DOCUMENTS 605794 1/1991 Australia .

OTHER PUBLICATIONS

Herbst et al., "Closed Loop Media Charging of Mills Based on a Smart Sensor System", Control International, Inc., University Research Part, Salt Lake City, Utah 84108, 1988, pp. 17-22.

*Primary Examiner*—Timothy V. Eley

*Attorney, Agent, or Firm*—Cushman Darby & Cushman

[57] ABSTRACT

An arrangement for recording the instant volume of grinding charge in the mill drum of a rotary drum mill of the kind provided with an internal lifting device. In order to enable the volume of grinding charge to be used in a better way as a parameter for controlling mill operation, the lifting device is resilient and is provided with a load detecting device which, during each drum revolution, detects when the lifting device comes into engagement with, and is in engagement with the grinding charge present in the drum and leaves, or is caused to leave, engagement with the grinding charge. The arrangement also includes a tension sensing device which registers the tension on the load detector, this tension being contingent on the load to which the lifting device is subjected by the grinding charge.

11 Claims, 3 Drawing Sheets

TELEMETRY SYSTEM

ARRANGEMENT FOR REGISTERING THE INSTANT GRINDING CHARGE VOLUME OF A GRINDING DRUM

BACKGROUND OF THE INVENTION

The present invention relates to an arrangement for registering the instant volume or the instant level of the charge in an ore-grinding drum of the kind that is provided with internal lifting means.

When processing mineral material for the selective or collective recovery of valuable material components, the processes concerned are preceded by mechanical crushing or disintegration of the material in a manner to free the valuable components, one from the other. The components are then mutually isolated with the aid of known separation methods, this isolation being contingent on differences in colour, shape, density or in differences in their respective surface active and magnetic properties, or other properties.

Mechanical crushing or disintegration of the ore material is normally started when the rock is blasted, and then continues successively in a series of disintegrating operations, which may be of mutually different kinds. The process used normally involves crushing the material in several stages with the aid of jaw crushers and/or cone crushers, with subsequent grinding of the material in rotating drum mills which include grinding bodies in the form of steel balls or steel bars. This conventional grinding of materials, however, results in considerable wear on the grinding bodies present in the mill, due to the hardness of the rock concerned, therewith also resulting in considerable costs for the provision of such grinding bodies.

In order to avoid this, a technique has been developed successfully in which the actual material itself, i.e. the material to be ground, forms the grinding bodies. This technique is known as autogenous grinding and is widely used.

In autogenous grinding systems, the composition of the grinding charge formed in the grinding drum is dependent on the properties of the material concerned. Existing mineral deposits, however, seldom have an homogenous structure and a homogenous mechanical strength, and consequently the autogenous grinding process requires a varying energy input, due to a naturally formed particle size composition of the grinding charge which is unsuitable for grinding purposes and which is known as the "critical size" and implies an over-representation of certain particle size fractions in the grinding charge, due to the incompetence of the material in autogenous grinding processes.

When critical particle sizes are formed in the mill, the mill is no longer able to function in the manner intended and the throughflow of material is quickly impaired, resulting in an increased energy requirement in kwh/tonne of ore, in order to achieve a predetermined degree of grinding.

The energy or power requirement of a mill depends on several factors, such as the density of the grinding charge, a mill constant, the extent of mill charge replenishment, or the instant volume of charge in the mill, relative mill speed, length and diameter of the mill. Normally, the weight of the grinding charge has been used as the deciding parameter for controlling the mill. This method is cost demanding, however, because of the weighing equipment needed to register continuously the changes in the weight of the grinding charge that occur during operation of the mill, which enables the steps necessary in order to improve prevailing operating conditions to be carried out as quickly as possible.

SUMMARY OF THE INVENTION

The object of the present invention is therefore to enable the existing volume of the grinding charge to be used as a parameter for controlling a grinding mill, irrespective of whether the mill is used in a conventional grinding system, a semi-autogenous grinding system or an autogenous grinding system, in a more precise, more reliable and considerably faster and not least simpler and less expensive manner than has hitherto been possible.

BRIEF DESCRIPTION OF THE DRAWINGS

The invention will now be described in more detail with reference to the accompanying drawings, in which.

DETAILED DESCRIPTION

Figure 1:
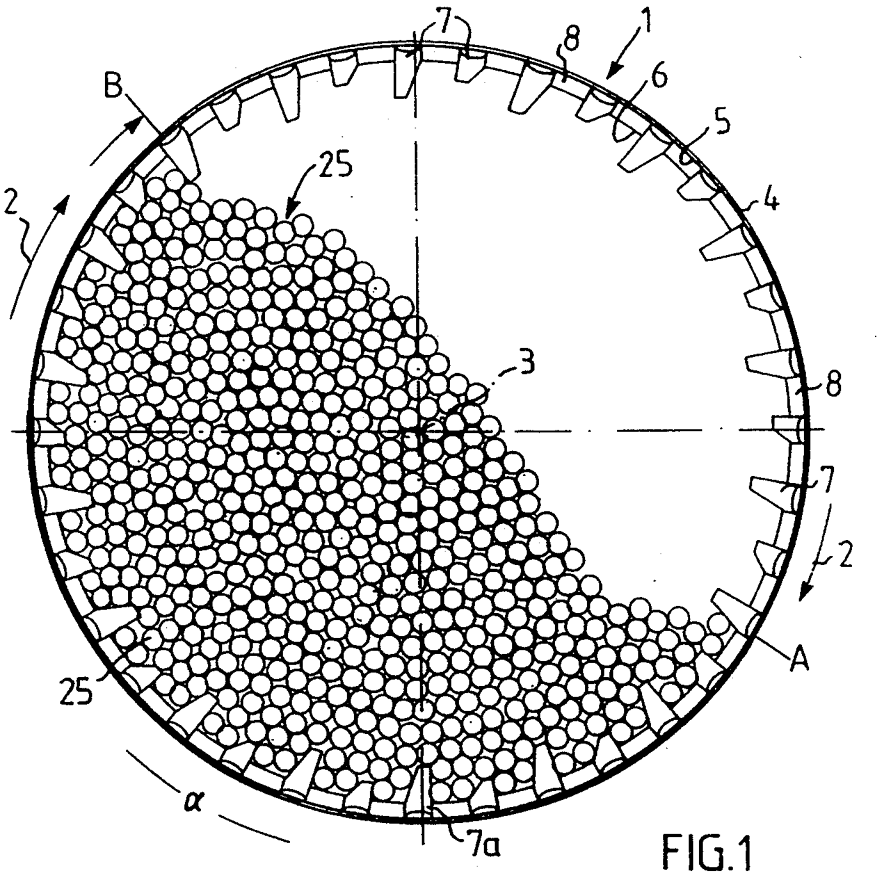
FIG. 1 is a cross-sectional view of a rotating, lined mill drum.
Figure 2:
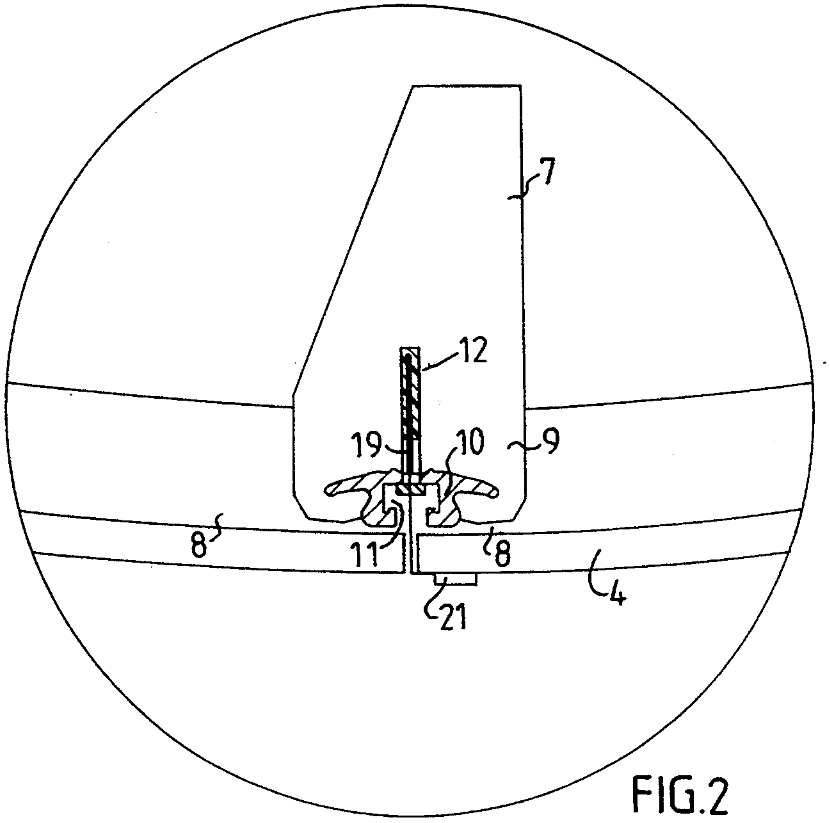
FIG. 2 is a sectional view in larger scale of a lifting device mounted in the drum lining and provided with detectors in accordance with the invention, the lifting device being shown in an inactive state.
Figure 3:
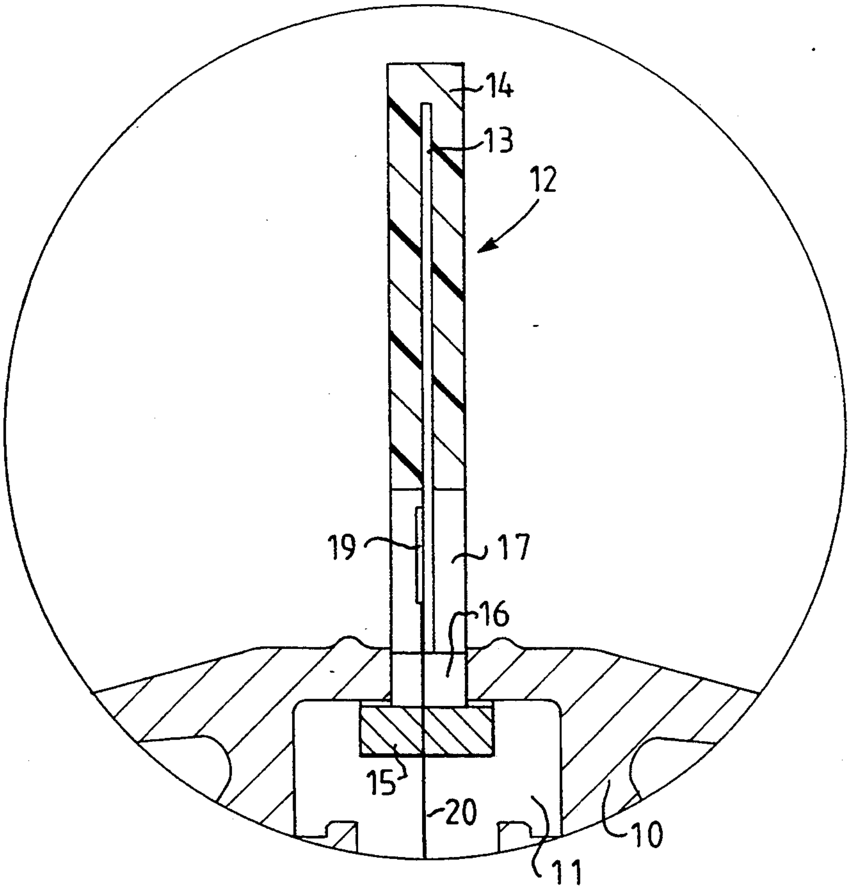
FIG. 3 illustrates the detector included in the lifting device, said illustration being in a larger scale than in FIG. 2.
Figure 4:
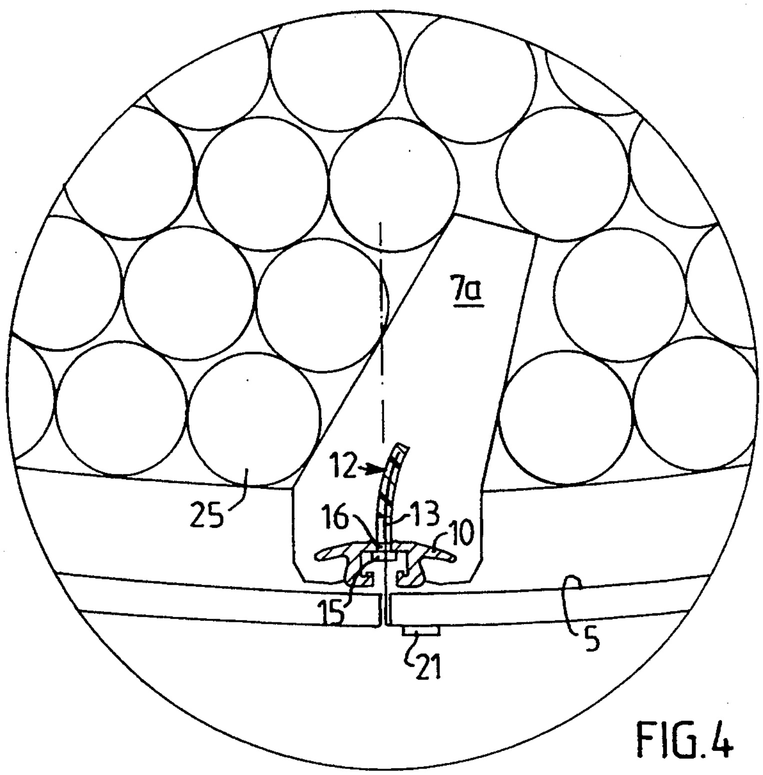
FIG. 4 illustrates on the same scale as that used in FIG. 2 the lifting device provided with the detector in accordance with the invention, said lifting device being shown in an active state.
Figure 5:
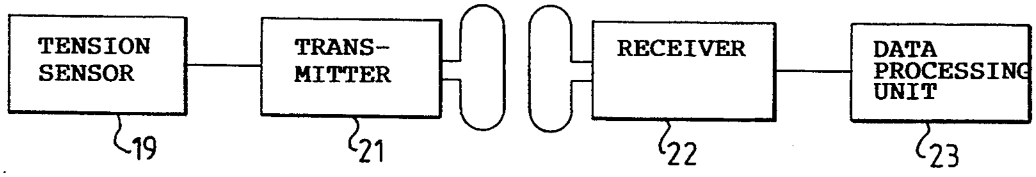
FIG. 5 is a block schematic of a telemetry system for transmitting data from the detector within the grinding drum to a remotely situated data processing unit, the telemetry system being shown by way of example only.

The reference numeral 1 in the drawings identifies generally a driven ore grinding drum which, under normal conditions, is rotated around its rotational axle 3 in the direction of the arrows 2 at a predetermined speed, which can be changed during a grinding operation as required. The inner surface 5 of the drum casing 4 is provided with a lining 6 which is comprised of wear elements in the form of lifting devices 7 which are generally parallel with the rotary axle 3 of the drum and plates 8 which are generally shorter than the lowest lifting device 7. The end part 9 of each respective lifting device 7 facing towards the drum casing 4 is provided with a grooved or channelled attachment bar 10 which extends along the full length of the lifting device 7. Each groove 11 is intended to accommodate an attachment bolt for firmly securing the lifting device 7 and therewith clamping adjacent wear plates 8 against the drum casing 4 with the aid of nuts fitted to respective bolts from outside the drum casing 4, in a known manner.

In accordance with the present invention, the lifting devices 7 are made of an elastomeric material, such as wear-resistant rubber, and the lining wear plates 8 may be made of the same or a similar elastomeric material as that from which the lifting devices 7 are made, or may be made of a metallic wear material, such as steel, preferably a steel which is alloyed with chromium-molybdenum at least in the surface layers.

The mill drum 1 is shown in FIG. 1 to rotate in the direction indicated by the arrows 2, and includes a grinding charge 25 comprising grinding bodies which may be comprised of the actual material that is to be ground, as in the case with autogenous grinding processes, or comprised of said material and steel balls, as in the case of semi-autogenous grinding processes, or solely of steel balls, as in the case of conventional grinding processes. Irrespective of the type of grinding charge concerned, it has been found beneficial, however, not least from the requirement of power input, to maintain the charge volume or the level of the charge within the mill as constant as possible during the grinding process. To this end, each of the lifting devices 7 is provided, in accordance with the invention, with a detector or sensor 12 which functions to register the different loads to which the lifting device 7 in question is subjected during each revolution turned by the drum. The lifting device fitted with the sensor 12 is preferably a high lifting device and is designated 7*a* hereinafter.

The detector 12, is comprised of a flexible, resilient bar 13 preferably made of spring steel and having a round, oval, square or four-sided cross-section, wherein the broadest sides of the bar are prefer-ably turned to face the direction of drum rotation. The detector bar 13 is connected intimately to its particular lifting device, so as to be forced to follow said device and to detect occurrent variations in the position of the lifting device 7*a* in a diametrical and may, to this end, be vulcanized directly in the lifting device, with the end of said detector facing towards the drum casing 4 firmly anchored in the attachment bar 10 of said lifting device or molded in a casing 14 with its end that faces towards the drum casing 4 anchored in a holder 16 which is provided with a seal 15 against the attachment bar 10 and which has the same diameter as the casing 14, as shown in the embodiment illustrated in the drawings. Thus, in this latter case, the detector 12 is intended to be mounted in a radially and inwardly extending aperture 17 which is formed in the attachment bar 10 and the lifting device 7*a* and the internal diameter of which should not be greater than the external diameter of the detector bar casing 14, so that intimate contact will be achieved between the detector bar and the lifting device 7*a*. When the lifting device is in its non-activated position, the detector bar 13 is radially orientated, i.e. extends radially inwards from the attachment bar 10 of the lifting device, and terminates short of the inner surface 5 of the drum casing, this shortfall distance being equal to or smaller than the height of the lower lifting device, as seen from the inside of said drum casing. When a lifting device 7*a* fitted with a detector 12, in accordance with the invention, has been worn down to a level which corresponds approximately to the original height of the lower lifting devices, the detector 12 on said device may be disconnected and the device then allowed to function as a lifting device until it is completely worn down, while at the same time replacing a completely worn lifting device 7 with a new lifting device 7*a* fitted with a detector 12 and being of the higher type of lifting device 7 fitted to the illustrated embodiment of the mill lining, wherein in the case of the other embodiment, all lifting devices may have the same high height.

The material from which the bar casing 14 is made may be an elastomeric material or a polymeric material, such as rubber or polyurethane. The holder 16 may be attached firmly in the holes 17 of the attachment bar, either by means of a press fit or by means of a screw joint 18.

The detector bar 13 is completely exposed between the detector casing 14 and the holder 16, and this freely exposed part of the detector bar 13 is connected to a tension sensor 19 which is connected, through a conductor 20, to a transmitter 21 applied to the outer surface of the drum casing and forming part of a data-transmission telemetry system. The telemetry system is illustrated by way of example only, and in addition to the sensor 19 and the transmitter 21 also includes a receiver 22 for receiving the data transmitted by the transmitter 21 and a data processing unit 23 in the form of a minicomputer or the like.

As the mill drum 1 rotates, the lifting device 7*a* fitted with the detector 12, as with all other lifting devices, will engage the grinding charge 25 at a point A (FIG. 1) and will leave, or be caused to leave, its engagement with the grinding charge at a point B and will remain essentially unchanged between points A and B, provided that the same volume of grinding charge 25 is maintained, i.e. provided that the volume does not increase or decrease.

When the lifting device 7*a* fitted with the detector 12 is brought into engagement with the grinding charge 25 at point A and is subjected to a load from the grinding charge which results in activation of the elastomeric lifting device 7*a* with a force which acts counter to the arrowed rotational direction of the mill drum, the lifting device 7*a* will be bent or deflected rearwardly, as seen in the arrowed direction of rotation of the drum, therewith also causing the detector bar 13 provided in the lifting device 7*a*, the bar preferably being made of spring steel, to be deflected rearwards to an extent that corresponds to the size of the load, and therewith subjected to a tension force corresponding to said load on its side facing towards the rotational direction of the drum, this tension being registered and the size thereof determined by the tension sensor 19 which, in turn, provides the transmitter 21 with the tension value sensed and registered at point A. The transmitter 21, in turn, sends this value, or data, to the receiver 22 of the telemetry system, which sends the value, or data, further to the data processing unit 23 of said system.

Thus, as the mill drum continues to rotate, the lifting device 7*a* provided with the sensor 12 will be subjected to varying loads and the detector bar 13 will be subjected to corresponding tension forces which are continuously registered and the magnitude thereof continuously determined by the tension sensor 19 of the detector 12 and transmitted further to the transmitter 21 and to the data processing unit 23 of the telemetry system, through the intermediary of the receiver 22.

When the lifting device 7*a* fitted with the detector 12 leaves or is brought out of engagement with the grinding charge 25 at point B, the load exerted by the grinding charge on the lifting device 7*a* will cease, and the lifting device, together with its detector bar 13, will return to its radially extending, non-activated starting position, in which no measurable tension occurs in the detector bar 13 and the tension sensor 19 will thus register a zero value.

In the case of the illustrated embodiment, the points A and B represent the most suitable grinding charge volume from the aspect of energy requirements, which can be expressed as a time t in those instances when the mill drum constantly rotates at a constant speed, as an angle $\alpha$ greater than or smaller than 180°, as a chord length, as a change in speed, etc., this reference value being stored in the data processing unit 23.

When the volume of grinding charge begins to change, reduces or increases, the angle α will also change, the time t or the chord length will become smaller with reducing grinding charge volume and greater with an increasing grinding charge volume, or the speed will change. These changes are immediate and the change in volume is detected directly by the detector bar 13 and registered by the sensor 19, wherewith the data processing unit 23 determines the magnitude and the directional sense of said change and, when an increase in charge volume is registered, ensures that the supply of material to the drum 1 is reduced until the ideal state has again been reached, and when a decrease in charge volume is indicated ensures that the supply of material to the drum 1 is increased until said ideal state has again been reached, said ideal state being established in the computer processing unit 23.

It will be understood that the invention is not restricted to the aforedescribed and illustrated embodiments thereof and that modifications and changes can be made within the scope of the inventive concept as defined in the following claims.

I claim:

1. An arrangement for registering an instant volume of a grinding charge in a rotating drum of a drum mill, comprising:

a rotary drum including at least one internal lifting device for material to be ground in the drum mill, said lifting device being resilient and provided with a load detecting device adapted to detect when said lifting device comes into and out of engagement with the grinding charge in the drum during each revolution of the drum, said detecting device comprising a flexible bar which is mounted in said lifting device and adapted to follow a displacement in a diametrical plane of the lifting device caused by a load to which the lifting device is subjected by the grinding charge, and a tension sensor provided on the flexible bar to register a tension in said flexible bar corresponding to said load.

2. The arrangement according to claim 1, wherein: said flexible bar is made of spring steel.

3. The arrangement according to claim 1, wherein: said displacement of the lifting device is adapted to cause a bending of the flexible bar giving rise to said tension in the flexible bar to be registered by the tension sensor.

4. The arrangement according to claim 1, wherein: said flexible bar is oriented radially to said drum in said lifting device.

5. The arrangement according to claim 1, wherein: said flexible bar is secured by a holder to an attachment beam for said lifting device.

6. The arrangement according to claim 5, wherein: said holder is sealed by a seal against said attachment beam.

7. The arrangement according to claim 1, wherein: said flexible bar has a round transverse cross-sectional shape.

8. The arrangement according to claim 1, wherein: said flexible bar has an oval transverse cross-sectional shape.

9. The arrangement according to claim 1, wherein: said flexible bar has a rectangular transverse cross-sectional shape.

10. The arrangement according to claim 1, wherein: said flexible bar is received in an aperture formed in the lifting device and said attachment bar is provided at an upper part thereof with a casing made of an elastomeric material, and has a diameter which is at least equal to the transverse cross-sectional dimension of said aperture.

11. The arrangement according to claim 1, further including:

a telemetry system located externally of the drum, including a transmitter;

a control system for said drum, including a data-processing unit;

said flexible bar being effectively connected to said transmitter, for inputting data to said data-processing unit based on said tension as registered in said flexible bar, for thereby controlling operation of said drum.

* * * * *